United States Patent
Kaneko et al.

(10) Patent No.: US 11,698,698 B2
(45) Date of Patent: Jul. 11, 2023

(54) TOUCH DISPLAY APPARATUS AND SENSING METHOD OF THE SAME FOR IDENTIFYING DIFFERENT TOUCH SOURCES AND REDUCING POWER CONSUMPTION

(71) Applicant: E Ink Holdings Inc., Hsinchu (TW)

(72) Inventors: Hiroyuki Kaneko, Hsinchu (TW); Hung-Wei Tseng, Hsinchu (TW); Yi-Chun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/445,835

(22) Filed: Aug. 25, 2021

(65) Prior Publication Data

US 2022/0075502 A1     Mar. 10, 2022

Related U.S. Application Data

(60) Provisional application No. 63/075,838, filed on Sep. 9, 2020.

(51) Int. Cl.
*G06F 3/041* (2006.01)
*G06F 3/044* (2006.01)
(Continued)

(52) U.S. Cl.
CPC ........ *G06F 3/04186* (2019.05); *G06F 1/3265* (2013.01); *G06F 3/0443* (2019.05);
(Continued)

(58) Field of Classification Search
CPC .. G06F 3/04186; G06F 3/0443; G06F 3/0446; G06F 1/3265; G06F 2203/04102;
(Continued)

(56) References Cited

U.S. PATENT DOCUMENTS 9,367,235 B2   6/2016  Westerman et al.
9,864,456 B2   1/2018  Bell
(Continued)

FOREIGN PATENT DOCUMENTS

CN    101615097 A    12/2009
CN    102419487 A     4/2012
(Continued)

OTHER PUBLICATIONS

Corresponding Taiwan office action dated Mar. 21, 2022.
(Continued)

*Primary Examiner* — Afroza Chowdhury
(74) *Attorney, Agent, or Firm* — CKC & Partners Co., LLC

(57) ABSTRACT

A sensing method includes sensing a first touch source at a first time point; transferring a first sensing signal of the first touch source to a CPU at the first time point; sensing a second touch source at a second time point; transferring a second sensing signal of the second touch source to the CPU at the second time point; stopping transferring the second sensing signal at a third time point, and the second touch source is away from the touch display device at a fourth time point; and the second time point is earlier than the third time point, the third time point is earlier than the fourth time point, and the first touch source is different from the second touch source.

10 Claims, 11 Drawing Sheets

(51) Int. Cl.
*G06F 1/3234* (2019.01)
*G06F 3/0354* (2013.01)

(52) U.S. Cl.
CPC ........ *G06F 3/03545* (2013.01); *G06F 3/0446* (2019.05); *G06F 2203/04102* (2013.01); *G06F 2203/04105* (2013.01); *G06F 2203/04106* (2013.01)

(58) Field of Classification Search
CPC . G06F 2203/04105; G06F 2203/04106; G06F 3/03545
See application file for complete search history.

(56) References Cited

U.S. PATENT DOCUMENTS

| | | | |
|---|---|---|---|
| 10,394,392 | B2 | 8/2019 | Bell |
| 10,545,608 | B2 | 1/2020 | Bell |
| 2011/0316815 | A1 | 12/2011 | Fang |
| 2013/0106756 | A1 | 5/2013 | Kono et al. |
| 2014/0125628 | A1* | 5/2014 | Yoshida ................ G06F 3/0445 345/174 |
| 2014/0168141 | A1 | 6/2014 | Sasselli et al. |
| 2017/0038842 | A1 | 2/2017 | Yairi et al. |
| 2017/0293388 | A1 | 10/2017 | Han et al. |
| 2017/0322645 | A1 | 11/2017 | Kao et al. |
| 2018/0113549 | A1* | 4/2018 | Park .................... G06F 3/03545 |
| 2020/0042122 | A1 | 2/2020 | Rosenberg et al. |
| 2021/0004113 | A1 | 1/2021 | Autio et al. |
| 2021/0382570 | A1 | 12/2021 | Jeon et al. |

FOREIGN PATENT DOCUMENTS

| | | |
|---|---|---|
| CN | 102707831 A | 10/2012 |
| CN | 104281340 A | 1/2015 |
| CN | 104423741 A | 3/2015 |
| CN | 105404436 A | 3/2016 |
| CN | 109144303 A | 1/2019 |
| CN | 109683733 A | 4/2019 |
| CN | 109906426 A | 6/2019 |
| CN | 110244868 A | 9/2019 |
| CN | 110275632 A | 9/2019 |
| CN | 107688411 B | 11/2019 |
| CN | 107346189 B | 7/2020 |
| KR | 20180064062 A | 6/2018 |
| TW | 201347006 A | 11/2013 |
| TW | 201447650 A | 12/2014 |
| TW | M528469 U | 9/2016 |
| TW | 201704938 A | 2/2017 |
| TW | 201706796 A | 2/2017 |
| TW | 1630523 B | 7/2018 |
| TW | 201830367 A | 8/2018 |
| TW | 202027569 A | 7/2020 |
| WO | 2018026163 A1 | 2/2018 |
| WO | 2018034496 A1 | 2/2018 |

OTHER PUBLICATIONS

Corresponding Taiwan office action dated Feb. 25, 2022.
Office Action of the related U.S. Appl. No. 17/115,833 dated Apr. 28, 2022 and Aug. 5, 2022.
The office action of corresponding CN application dated Apr. 23, 2023.
The office action of corresponding CN application No. 202110983141.X dated Apr. 29, 2023.

* cited by examiner

|  | First sensing element | | Second sensing element | |
|---|---|---|---|---|
|  | Positive polarity | Negative polarity | Yes (positive polarity) | No |
| Stylus | ✓ |  |  |  |
| Finger | ✓ | ✓ | ✓ |  |
| Palm |  | ✓ | ✓ |  |
| Ghost | ✓ | ✓ |  | ✓ |
| Water |  | ✓ |  | ✓ |

Fig. 7

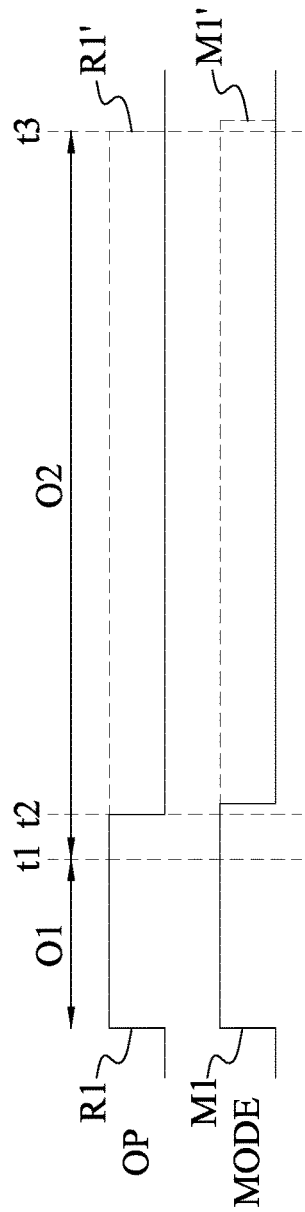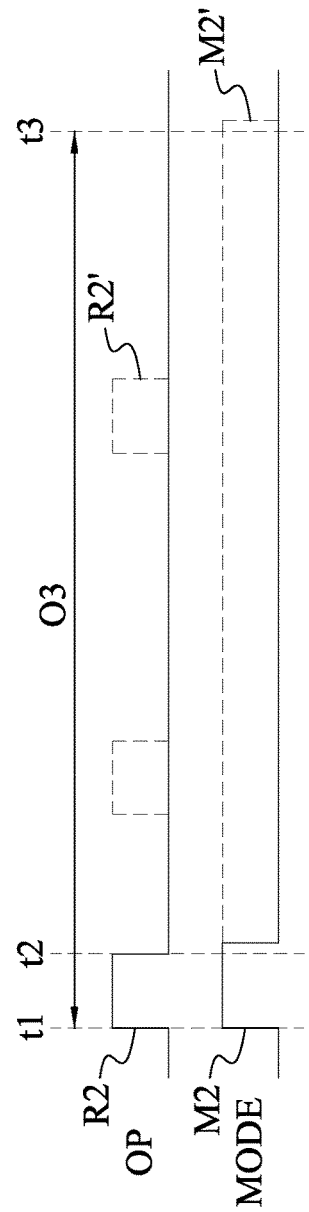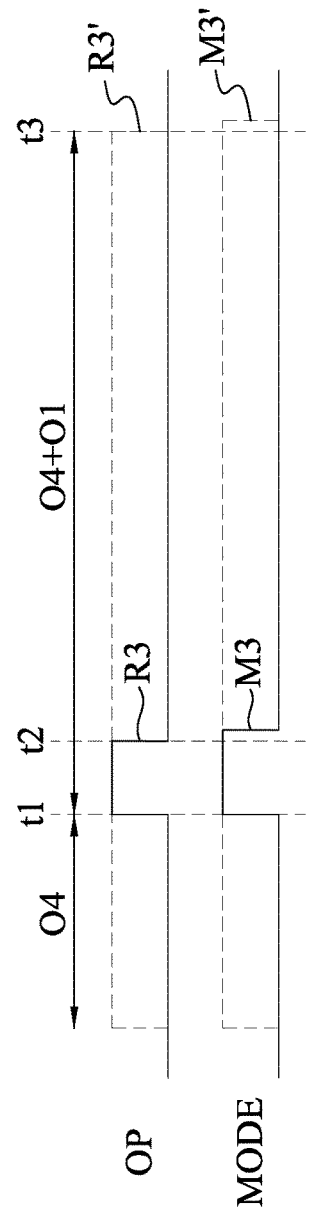

TOUCH DISPLAY APPARATUS AND SENSING METHOD OF THE SAME FOR IDENTIFYING DIFFERENT TOUCH SOURCES AND REDUCING POWER CONSUMPTION

CROSS-REFERENCE TO RELATED APPLICATION

This application claims priority to U.S. Provisional Application Ser. No. 63/075,838, filed Sep. 9, 2020, which is herein incorporated by reference in its entirety.

BACKGROUND

Field of Invention

The present invention relates to a sensing method of a touch display apparatus, especially for a sensing method that can identify a stylus.

Description of Related Art

The sensing method of the capacitor stylus and the sensing method of fingers or palm are the same for the touch display apparatus nowadays. Therefore, it is not easy to identify capacitor stylus, finger, or palm for a touch display apparatus without pressure feedback, and therefore incorrect identification may occur. In addition, ghost or water may be identified as capacitance stylus or hands by using the touch display apparatus without pressure feedback.

Therefore, when the touch display apparatus is not in normal usage state (e.g., the touch display apparatus are touched by multiple fingers or a palm), the CPU of the touch display apparatus will keep operating and the sensing signals are transferred continuously. As a result, power consumption of the touch display apparatus is high, and therefore causes the disadvantage of high electricity consumption.

Accordingly, it is still a development direction for the industry to provide a sensing method that may identify different touch sources so as to reduce the power consumption of the touch display apparatus.

SUMMARY

One aspect of the present disclosure is a sensing method of a touch display device.

In some embodiments, the sensing method includes sensing a first touch source at a first time point; transferring a first sensing signal of the first touch source to a CPU at the first time point; sensing a second touch source at a second time point; transferring a second sensing signal of the second touch source to the CPU at the second time point; stopping transferring the second sensing signal at a third time point, and the second touch source is away from the touch display device at a fourth time point; and the second time point is earlier than the third time point, the third time point is earlier than the fourth time point, and the first touch source is different from the second touch source.

In some embodiments, the sensing method further includes switching a synchronization signal from a first level to a second level different form the first level at the first time point so as to stop transferring the second sensing signal at the third time point.

In some embodiments, the first time point is earlier than the second time point.

In some embodiments, the second time point is earlier than the first time point, and the first time point is earlier than the third time point.

In some embodiments, when the touch display device is in a stylus mode, a CPU mode corresponding to the second touch source is in a standby mode at the third time point.

In some embodiments, when the first touch source is not sensed, the synchronization signal is switched from the second level to the first level.

In some embodiments, when the touch display device is in a finger touch mode, the CPU is in a standby mode at the third time point.

In some embodiments, sensing the first touch source further includes measuring a first signal and a second signal by a first sensing element of the touch display device; measuring a third signal by a second sensing element of the touch display device; and selecting an intersection between the second signal from the first sensing element and the third signal from the second sensing element so as to identify a touch region of the first touch source.

In some embodiments, sensing the second touch source further includes selecting an intersection between the first signal from the first sensing element and the third signal from the second sensing element so as to identify a touch region of a finger.

Another aspect of the present disclosure is a touch display apparatus having a sensing method.

In some embodiments, the touch display apparatus having a sensing method includes a first sensing element; a second sensing element located below the first sensing element; a flexible display device located between the first sensing element and the second sensing element; and a cover located above the first sensing element.

BRIEF DESCRIPTION OF THE DRAWINGS

The invention can be more fully understood by reading the following detailed description of the embodiment, with reference made to the accompanying drawings as follows:

FIG. 7 is a sensing result of the first sensing element and the second sensing element based on FIGS. 6A to 6B;

FIG. 9A is a sensing result and CPU mode schematic when a touch display device is in a finger touch mode (that is, not the stylus mode) according to one embodiment of the present disclosure;

FIG. 9B is a sensing result and CPU mode schematic when a touch display device is in a finger touch mode (that is, not the stylus mode) according to another embodiment of the present disclosure;

FIG. 9C is a sensing result and CPU mode schematic when a touch display device is in a finger touch mode (that is, not the stylus mode) according to another embodiment of the present disclosure;

DETAILED DESCRIPTION

Figure 1:
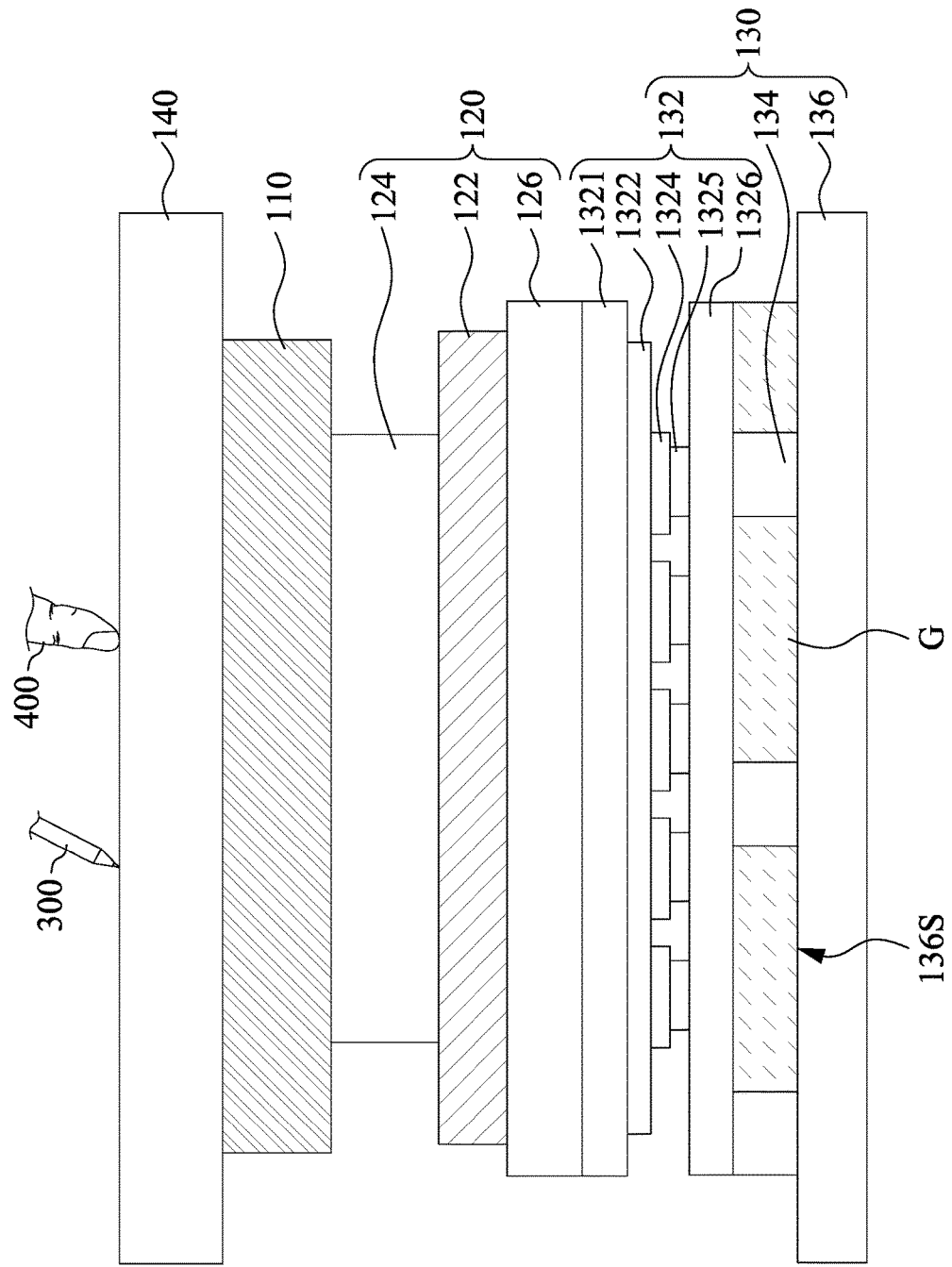
FIG. 1 is a cross-sectional view of a touch display apparatus according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a touch display apparatus 100 according to one embodiment of the present disclosure. The touch display apparatus 100 includes a first sensing element 110, a flexible display device 120, a second sensing element 130, and a cover 140. The flexible display device 120 is disposed below the first sensing element 110. The flexible display device 120 is located between the first sensing element 110 and the second sensing element 130. The cover 140 is located above the first sensing element 110.

The first sensing element 110 is a capacitance touch element. In some embodiments, the first sensing element 110 has mutual capacitance sensing function. In other embodiments, the first sensing element 110 has mutual capacitance sensing function and self-capacitance sensing function. For example, the self-capacitance sensing function of the first sensing element 110 may sense capacitance difference when fingers, hands or stylus move towards the cover 140 so as to active the touch display apparatus 100. The mutual capacitance sensing function of the first sensing element 110 may sense touch regions of fingers, hands, or stylus. The first sensing element 110 of the present disclosure is embedded on-cell element, but the disclosure is not limited in this regard. The first sensing element 110 may be plug-in element or embeded in-cell element.

The flexible display device 120 includes thin film transistor array 122, a display medium layer 124, and a protection layer 126. The thin film transistor array 122 is located below the display medium layer 124. The thin film transistor array 122 is located between the display medium layer 124 and the protection layer 126.

The second sensing element 130 includes a pressure sensing element 132, a pressure sensing layer 134, and a reaction force layer 136. In the present embodiment, the pressure sensing element 132 is a capacitance pressure sensing element. The pressure sensing element 132 includes a substrate 1321, a top electrode layer 1322, an insulation layer 1324, a bottom electrode layer 1325, and a protection layer 1326. The top electrode layer 1322 and the bottom electrode layer 1325 form a capacitance electrode array. The top electrode layer 1322, the insulation layer 1324, and the bottom electrode layer 1325 are located between the substrate 1321 and the protection layer 1326. One exemplary embodiment of the protection layer 1326 of the present disclosure is a metal layer, but the present disclosure is not limited in this regard. For example, the protection layer 1326 may also be plastic layer, as long as the protection layer 1326 can provide reaction force to the pressure sensing layer 134 and the pressure sensing element 132, and can protection the flexible display device 120.

The pressure sensing layer 134 is located between the flexible display device 120 and the reaction force layer 136. In the present embodiment, the pressure sensing layer 134 may be a foam tape layer and has adhesive ability. The pressure sensing layer 134 may be an adhesive layer containing space filled with air G between multiple foam tapes. The height of the pressure sensing layer 134 may be compressed by external force so as to provide reaction force upon the pressure sensing element 132. In other embodiments, the pressure sensing layer 134 may be an air layer.

The reaction force layer 136 is located below the pressure sensing layer 134. The reaction force layer 136 is configured to provide reaction force to the pressure sensing layer 134 and the pressure sensing element 132, and the reaction force layer 136 can protection the flexible display device 120. Specifically, the reaction force layer 136 has a flat top surface 136S facing the pressure sensing layer 134, and the reaction force layer 136 has a substantially uniform thickness. As such, the reaction force layer 136 may provide uniform reaction force to the pressure sensing layer 134 and the pressure sensing element 132. The second sensing element 130 is configured to sense pressure value applied on the pressure sensing element 132 by the fingers, the hands, or the stylus.

As shown in FIG. 1, the stylus 300 of the present disclosure may be applied in the touch display apparatus 100. The material of a head of the stylus 300 includes high dielectric coefficient material, ceramic material or carbon-doped plastic. The first sensing element 110 of the touch display apparatus 100 is configured to produce a signal corresponding to a touch region of the stylus 300 and a signal corresponding to a touch region of a finger 400. In addition, the material of a body of the stylus 300 includes non-conducting material so as to reduce capacitance between hands and the head of the stylus 300. Due to the material property of the head of the stylus 300, the signal corresponding to the stylus 300 and the signal corresponding to the finger 400 have opposite polarity. As such, by employing the first sensing element 110 and the second sensing element 130, the advantage of identify the touch signals of the finger 400 and the stylus 300 may be achieved. The method of identifying the finger 400 and the stylus 300 will be described in detail in the following paragraphs.

Figure 2:
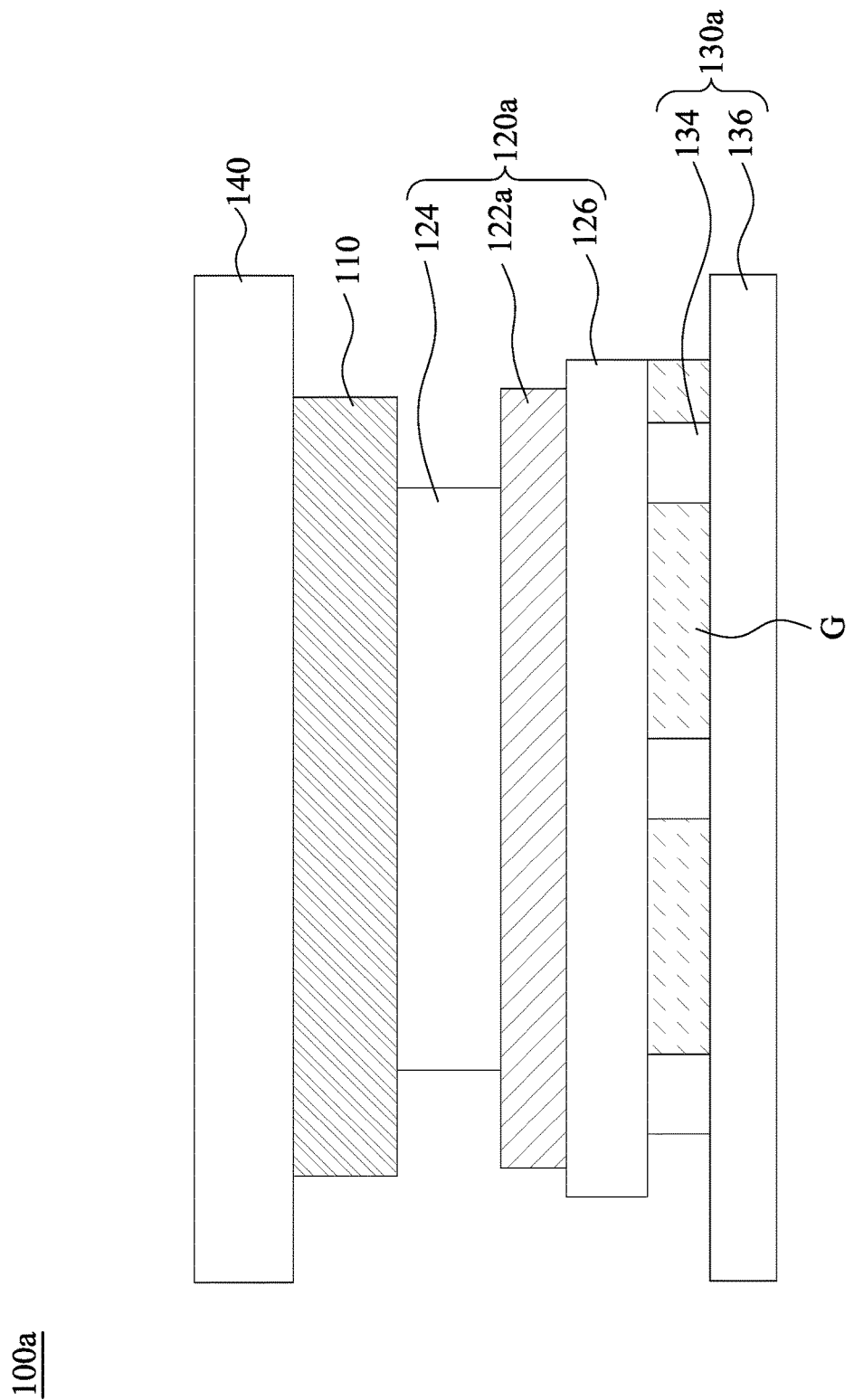
FIG. 2 is a cross-sectional view of a touch display apparatus according to another embodiment of the present disclosure.

FIG. 2 is a cross-sectional view of a touch display apparatus 100a according to another embodiment of the present disclosure. In the present embodiment, the touch display apparatus 100a is substantially the same as the touch display apparatus 100 shown in FIG. 1, and the difference is that the pressure sensing element of the second sensing element 130a is integrated to the flexible display device 120a. In other words, the pressure sensing element of the second sensing element 130a can be embedded into the circuits of the flexible display device 120a through in-cell technique so as to reduce the thickness and cost of the touch display apparatus 100a. In the present embodiment, the protection layer 126 of the flexible display device 120a is in contact with the pressure sensing layer 134. The touch display apparatus 100a has the same advantages as those of the touch display apparatus 100, and the description is not repeated hereinafter.

Figure 3:
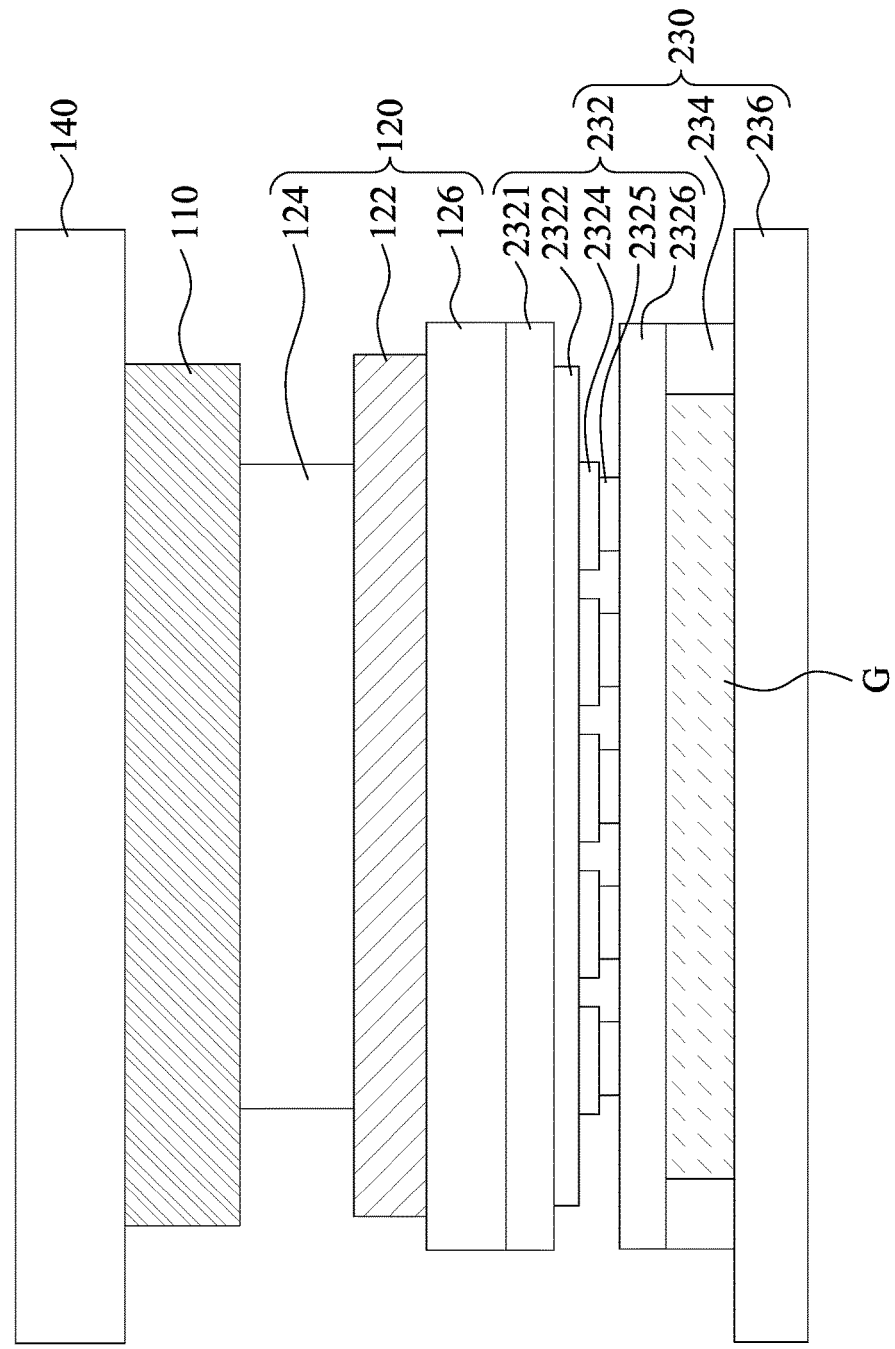
FIG. 3 is a cross-sectional view of a touch display apparatus according to another embodiment of the present disclosure.

FIG. 3 is a cross-sectional view of a touch display apparatus 200 according to another embodiment of the present disclosure. The touch display apparatus 200 is substantially the same as the touch display apparatus 100 shown in FIG. 1, and the difference is that the pressure sensing element 232 of the touch display apparatus 200 is a resistance pressure sensing element. The pressure sensing element 232 includes a substrate 2321, a top electrode layer 2322, a piezoelectric material layer 2324, a bottom electrode layer 2325, and a protection layer 2326. The top electrode layer 2322 and the bottom electrode layer 2325 form a resistance electrode array. The pressure sensing element 232 is by transferring the deformation of the piezoelectric material layer 2324 to the pressure value.

In the present embodiment, the pressure sensing layer 234 is an air layer formed by surrounding air G by a frame. The height of the pressure sensing layer 234 may be compressed by external force so as to provide reaction force upon the pressure sensing element 232. In other embodiments, the pressure sensing layer 234 may be the foam tape layer as shown in FIG. 1. The touch display apparatus 200 has the same advantages as those of the touch display apparatus 100, and the description is not repeated hereinafter.

Figure 4:
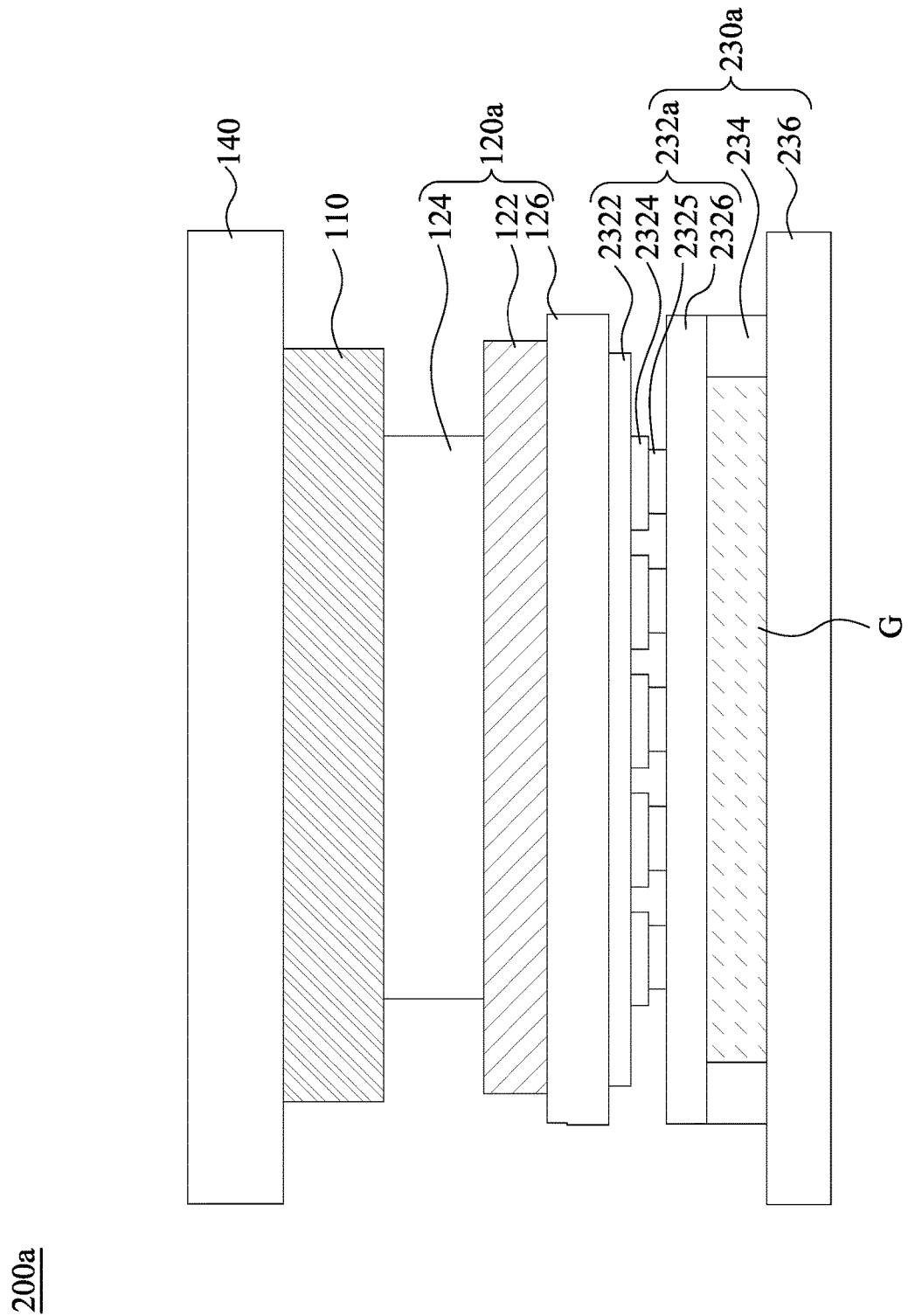
FIG. 4 is a cross-sectional view of a touch display apparatus according to another embodiment of the present disclosure.

FIG. 4 is a cross-sectional view of a touch display apparatus 200a according to another embodiment of the present disclosure. The touch display apparatus 200a is substantially the same as the touch display apparatus 200 shown, and the difference is that the top electrode layer 2322 of the pressure sensing element 232a of the second sensing element 230a of the touch display apparatus 200a is directly disposed below the protection layer 126, and the pressure sensing element 232a has no substrate 2321. In other words, the second sensing element 230a can be integrated to the flexible display device 120a so as to reduce the thickness and cost of the touch display apparatus 200a. In the present embodiment, the protection layer 126 of the flexible display device 120a is in contact with the top electrode layer 2322. The touch display apparatus 200a has the same advantages as those of the touch display apparatus 200, and the description is not repeated hereinafter.

Figure 5:
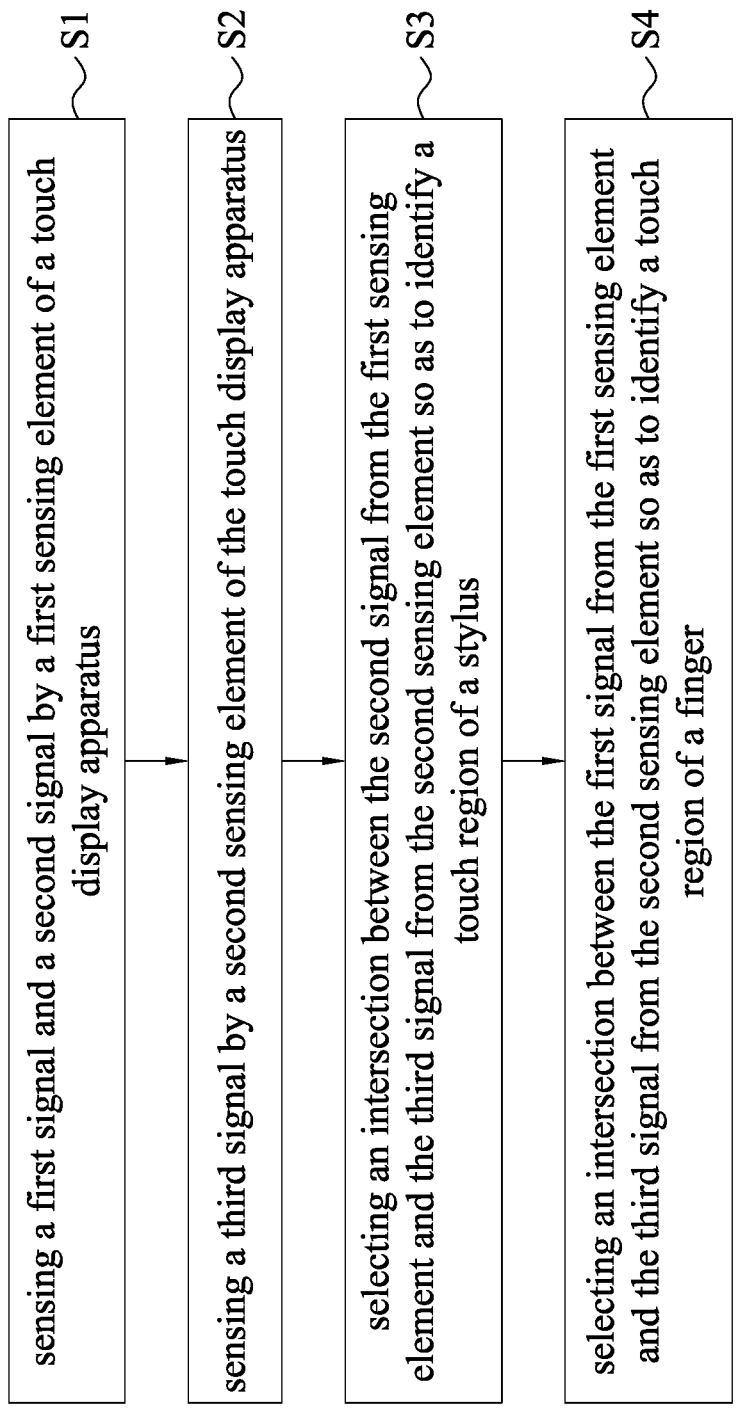
FIG. 5 is a flow chart of a sensing method of a stylus according to one embodiment of the present disclosure.

FIG. 5 is a flow chart of a sensing method of a stylus according to one embodiment of the present disclosure. The sensing method of a stylus begins at a step S1 by sensing a first signal and a second signal by a first sensing element of a touch display apparatus. Subsequently, in step S2, sense a third signal by a second sensing element of the touch display apparatus. Subsequently, in step S3, select an intersection between the second signal from the first sensing element and the third signal from the second sensing element so as to identify a touch region of a stylus. Finally, in step S4, select an intersection between the first signal from the first sensing element and the third signal from the second sensing element so as to identify a touch region of a finger.

Figure 6B:
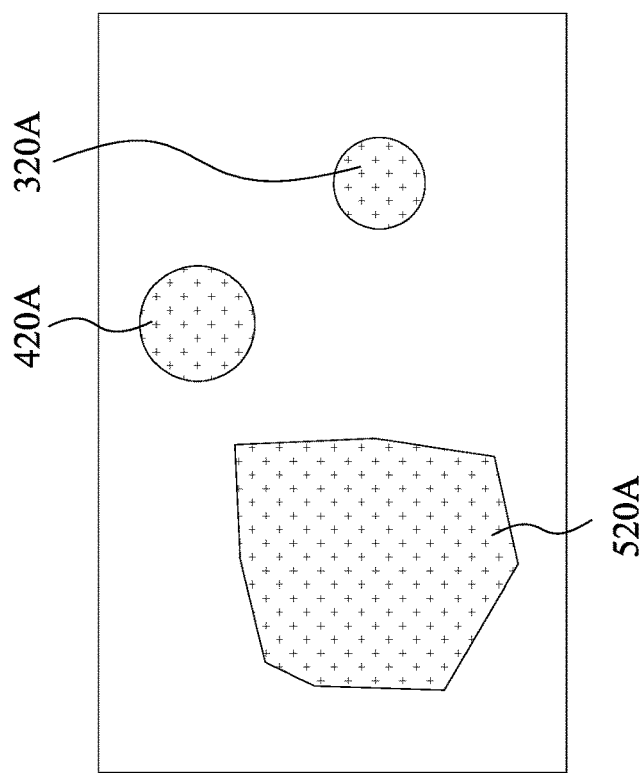
FIGS. 6A to 6B are schematic of sensing results of the first sensing element and the second sensing element according to various embodiments of the present disclosure.
Figure 6A:
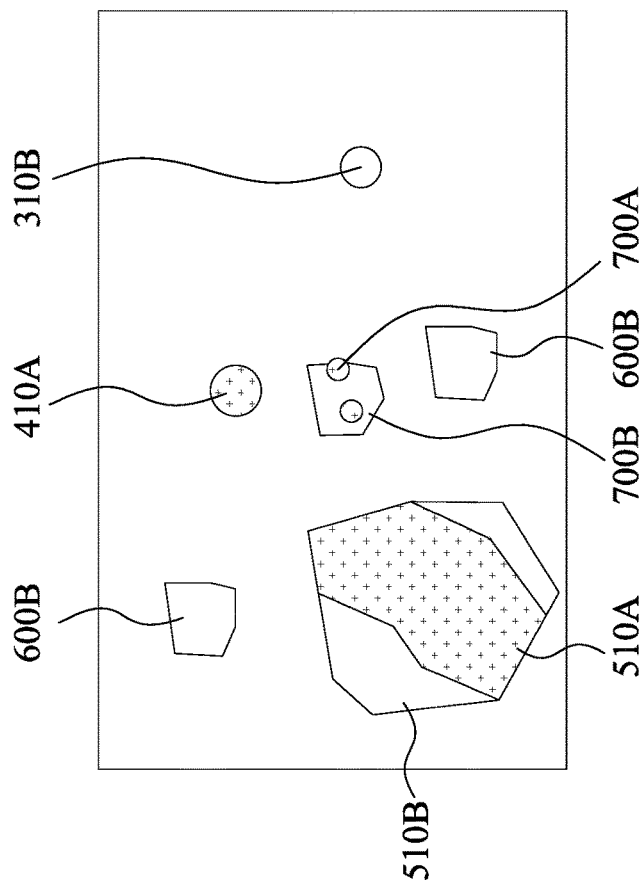

FIG. 6A is a schematic of sensing results 110S of the first sensing element according to various embodiments of the present disclosure. Reference is made to step S1 in FIG. 5 and FIG. 6A. The first sensing element 110 may sense a second signal 310B from the stylus 300 (see FIG. 1), and the second signal 310B has negative polarity. The first sensing element 110 may sense a first signal 410B from the finger 400 (see FIG. 1), and the first signal 410B has positive polarity. The first sensing element 110 may sense a first signal 510A and a second signal 510B from the palm. The first signal 510A has positive polarity, and the second signal 510B has negative polarity. Ghost produced by the mutual capacitance sensing of the first sensing element 110 demonstrated as the second signal 600B. The first sensing element 110 may sense water on the cover 140 to produce a first signal 700A and a second signal 700B. The first signal 700A has positive polarity, and the second signal 700B has negative polarity.

FIG. 6B is a schematic of sensing results 130S of the second sensing element according to one embodiment of the present disclosure. Reference is made to step S2 in FIG. 5 and FIG. 6B. The second sensing element 130 may sense a third signal 320A from the stylus 300 (see FIG. 1). The second sensing element 130 may sense a third signal 420A from the finger 400 (see FIG. 1). The second sensing element 130 may sense a third signal 520A from the palm. The third signals 320A, 420A, 520A are all pressure value. Since the ghost is produced by the mutual capacitance sensing of the first sensing element 110, there is no pressure applied on the second sensing element 130. Since there is no sufficient pressure applied on the second sensing element 130 by water, there is no third signal corresponding to the second sensing element 130.

FIG. 7 is a sensing result of the first sensing element and the second sensing element based on FIGS. 6A to 6B. FIG. 8A is a schematic of an algorithm for identifying stylus. Reference is made to step S3 in FIG. 5, FIG. 7, and FIG. 8A. In step S3, select an intersection between the second signals 310B, 510B, 600B, 700B (that is the negative polarity signals) of the first sensing element 110 and the third signal 320A (that is the pressure value) of the second sensing element 130. As shown in FIG. 8A, there is an intersection region between the second signal 310B and the third signal 320A corresponding to the stylus 300, and there is an intersection region between the second signal 510B and the third signal 520A corresponding to the palm. Since the second sensing element 130 does not sense the third signal corresponding to ghost and water, it can prevent ghost and water from being identified as stylus 300. In this step, the size of a region of the first signal 510A selected may be expanded first, and then perform the aforesaid selecting to eliminate the intersection region between the second signal 510B and the third signal 520A corresponding to the palm. As such, the touch region corresponding to the stylus 300 can be identified.

Figure 8B:
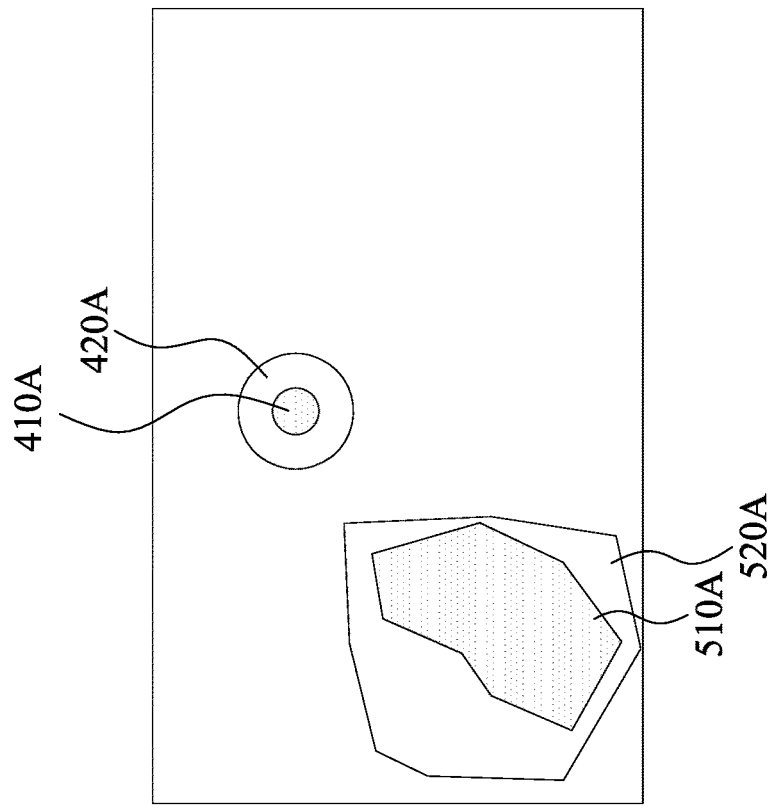
FIGS. 8A to 8B are schematic of an algorithm for identifying a stylus.
Figure 8A:
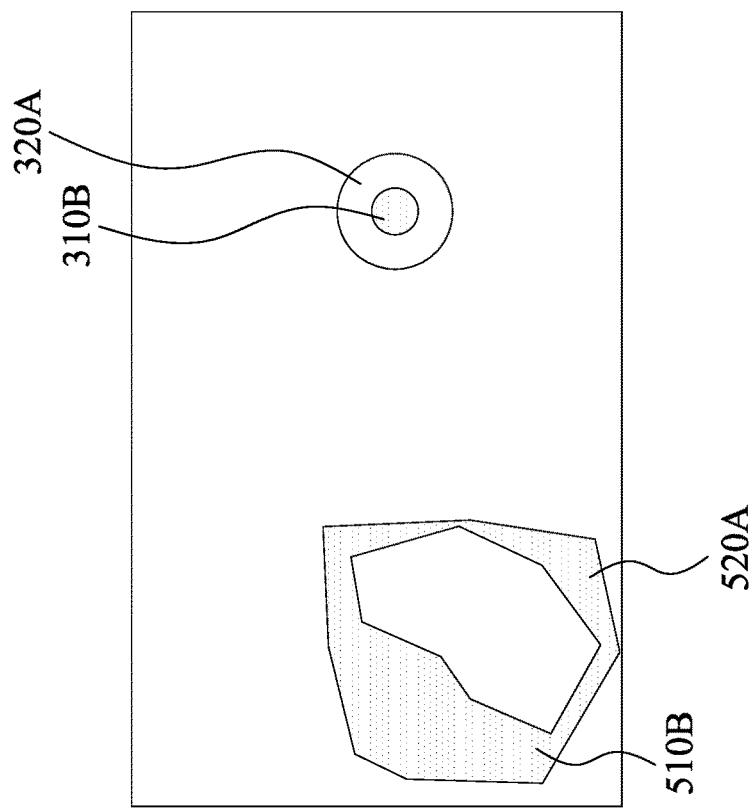

FIG. 8B is a schematic of an algorithm for identifying stylus. Reference is made to step S4 in FIG. 5, FIG. 7, and FIG. 8B. In step S3, select an intersection between the first signals 410A, 510A, 700A and the third signals 320A, 420A, 520A of the of the first sensing element so as to identify the touch region of the finger 400. As shown in FIG. 8B, there is an intersection between the first signal 410A and the third signal 420A corresponding to the finger 400, and there is an intersection between the first signal 510A and the third signal 520A corresponding to the palm. As described above, by expanding the size of the selected region of the first signal 510A, the signal corresponding to the palm can be identified. Therefore, in step S4, the touch region corresponding to the finger 400 can be identified after exclude the touch regions corresponding to the palm and the stylus 300. In the aforementioned sensing method of a stylus, the sequence of the steps is demonstrated and an example, for example, step S1 may be exchanged with step S2, and step S3 may be exchanged with step S4, but the disclosure is not limited in this regard.

As described above, the first sensing element may sense signals corresponding to the stylus and fingers or palm of which the polarities are different by using stylus having non-conducting material. The touch signals from fingers, palm, and stylus can be identified by selecting an intersection between the signals sensed by the first sensing element and the second sensing element. In addition, since there is no third signal corresponding to the ghost and water sensed by the second sensing element, it can prevent ghost and water from being identified as stylus.

FIG. 9A is a sensing result and CPU mode schematic when a touch display device is in a finger touch mode (that is, not the stylus mode) according to one embodiment of the present disclosure. A transmission operation OP and a CPU (not shown) mode MODE of the flexible display device 120 of the first sensing element 110 and the second sensing element 130 when a first object O1 and a second object O2 sequentially touch the touch display apparatus 100 (see FIG. 1) are illustrated in FIG. 9A. In the present embodiment, the first object O1 can be finger, and a number of fingers is one or two. The second object O2 can be fingers of which a number is equal to or greater than three.

As described above, touch region of stylus and touch region of finger can be identified by using the sensing method of the stylus shown in FIG. 5. Different touch sources can be categorized as a first touch source and a second touch source under different usage condition of the touch display apparatus 100. Touch signals corresponding to the first touch source are signals that are continuously transferred to the CPU under the current usage condition, and touch signals corresponding to the second touch source are signals of which the transmission are stopped under the current usage condition. The sensing method to identify stylus and fingers shown in FIG. 5 is merely demonstrated as an example, and the sensing method of the present disclosure is not limited in this regard.

Specifically, in the present embodiment, when there is no stylus in contact with the touch display apparatus 100, the first object O1 is defined as the first touch source, and the second object O2 is defined as the second touch source. As shown by the line R1, when a number of sensed touch regions of finger is one or two (that is, the first object O1), a signal of the transmission operation OP rises to a high level, which means that the sensing signals from the first sensing element 110 and the second sensing element 130 are continuously transmitted to the CPU of the flexible display device 120. A signal of the CPU mode MODE also rises to the high level, which means the CPU is running or woken up from a standby mode.

However, when a number of fingers sensed is equal to or greater than three (that is, the second object O2), the sensing signal corresponding to the second object O2 is transmitted to the CPU at time point t1. The signal of the transmission operation OP falls to a low level, which means that the transferring of the sensing signals to the CPU is stopped at the time point t2. At this time, the second touch source has not been removed from the touch display apparatus 100. In other words, the signal of the CPU mode MODE remains at the high level at the time point 1, and the signal of the CPU mode MODE falls to the low level after receiving the sensing signal corresponding to the second object O2. Therefore, when there is the sensing signal of the second touch source that the second object O2 corresponds to, the CPU is switched to the standby mode after receiving the sensing signal, and the second touch source is removed from the touch display apparatus 100 at the time point t3.

For example, after the second object O2 is sensed at the time point t1, the duration of transferring the sensing signal to the CPU (from the time point t1 to the time point t2) lasts for about 15 milliseconds to 35 milliseconds, and then the signal of the CPU mode MODE falls to the low level. Since the time point when the CPU mode MODE switched to the low level is really close to the time point t2, the time point when the CPU is switched to the standby mode will be considered substantially as the time point t2 in the following paragraphs. The second touch source is removed from the touch display apparatus 100 at the time point t3.

The line R1' illustrated in FIG. 9A corresponds to the conventional technique, which represents a schematic of the transmission operation OP and the CPU mode MODE when identifying the touch sources is unavailable by the touch display apparatus 100. As shown by the line R1', when the touch sources correspond to the first object O1 or the second object O2, the signal of the transmission operation OP remains at the high level until the touch sources are removed from the touch display apparatus 100. That is, the sensing result will be continuously transferred to the CPU. Under such condition, the line M1' reveals that the CPU is remained at working state which consumes power continuously.

Accordingly, power consumption of the touch display apparatus 100 can be decreased by omitting transferring sensing results and operation of the CPU when there is only the second touch source by identifying the category of the touch sources, such that the power consumption of transferring the sensed results from the second touch source and operation of the CPU between the time point t2 to the time point t3 can be reduced.

FIG. 9B is a sensing result and CPU mode schematic when a touch display device is in a finger touch mode (that is, not the stylus mode) according to another embodiment of the present disclosure. A transmission operation OP and a CPU mode MODE of the flexible display device 120 of the first sensing element 110 and the second sensing element 130 when a third object O3 touches the touch display apparatus 100 (see FIG. 1) are illustrated in FIG. 9B. In the present embodiment, the third object O3 is a palm, and the third object O3 is defined as the second touch source.

As shown by the line R2, when the third object O3 is identified, the signal of the transmission operation OP rises to the high level, which means that the sensing signal corresponding to the third object O3 is transmitted to the CPU at the time point t1. The signal of the transmission operation OP falls to the low level at the time point t2, which means that the transmission of the sensing signals to the CPU is stopped at the time point t2. The signal of the CPU mode MODE rises to the high level at the time point t1, and the signal of the CPU mode MODE falls to the low level after the sensing signal corresponding to the third object O3 is received. In other words, since the sensing signal corresponds to the second touch source, the CPU is switched to the standby mode after receiving the sensing signal.

The line R2' illustrated in FIG. 9B corresponds to the conventional technique, which represents a schematic of the transmission operation OP and the CPU mode MODE when identification of the touch sources is unavailable by the touch display apparatus 100. As shown by the line R2', when the touch sources correspond to the third object O3, the signal of the transmission operation OP remains at the high level until the touch sources are removed from the touch display apparatus 100. That is, the sensing result will be continuously transferred to the CPU. Multiple separate touch signal from the third objects O3 are illustrated in FIG. 9B as an example. Under such condition, the line M2' reveals that the CPU is remained at performance state which consumes power excessively. Accordingly, power consumption of the touch display apparatus 100 can be decreased by omitting transferring sensing results and operation of the CPU when there is only the second touch source through identifying the category of the touch sources.

FIG. 9C is a sensing result and CPU mode schematic when a touch display device is in a finger touch mode (that is, not the stylus mode) according to another embodiment of the present disclosure. A transmission operation OP of the first sensing element 110 and the second sensing element 130 and a CPU mode MODE of the flexible display device 120 when a fourth object O4 and both a first object O1 and the fourth object O4 touch the touch display apparatus 100 are illustrated in FIG. 9C. In the present embodiment, the fourth object O4 can be water, and the first object O1 is finger as mentioned in paragraphs corresponding to FIG. 9A of which the number is one or two. As described above, since touch signals from water can be identified, and therefore the signal of the transmission operation OP is remained at the low level.

In the present embodiment, the first object O1 and the fourth object O4 which touched the touch display apparatus 100 simultaneously are defined as the second touch source. As shown by the line R3, when the fourth object O4 and the first object O1 are identified simultaneously, the signal of the transmission operation OP rises to the high level, which means that the sensing signal is transmitted to the CPU at the time point t1. The signal of the transmission operation OP falls to the low level at the time point t2, which means that the transmission of the sensing signals to the CPU is stopped at the time point t2. The signal of the CPU mode MODE rises to the high level at the time point t1, and the signal of the CPU mode MODE falls to the low level after the sensing signals corresponding to the fourth object O4 and the first object O1 are received. In other words, since the sensing signal corresponds to the second touch source, the CPU is switched to the standby mode after receiving the sensing signal.

The line R3' illustrated in FIG. 9C corresponds to the conventional technique, which represents a schematic of the transmission operation OP and the CPU mode MODE when identification of the touch sources is unavailable by the touch display apparatus 100. As shown by the line R3', when the touch sources correspond to the first object O1 and the fourth object O4, the signal of the transmission operation OP remains at the high level until the touch sources are removed from the touch display apparatus 100. That is, the sensing result will be continuously transferred to the CPU. Under such condition, the line M3' reveals that the CPU is remained at performance state which consumes power excessively. Accordingly, power consumption of the touch display apparatus 100 can be decreased by omitting transferring sensing results and operation of the CPU when there is only the second touch source through identifying the category of the touch sources.

Figure 10:
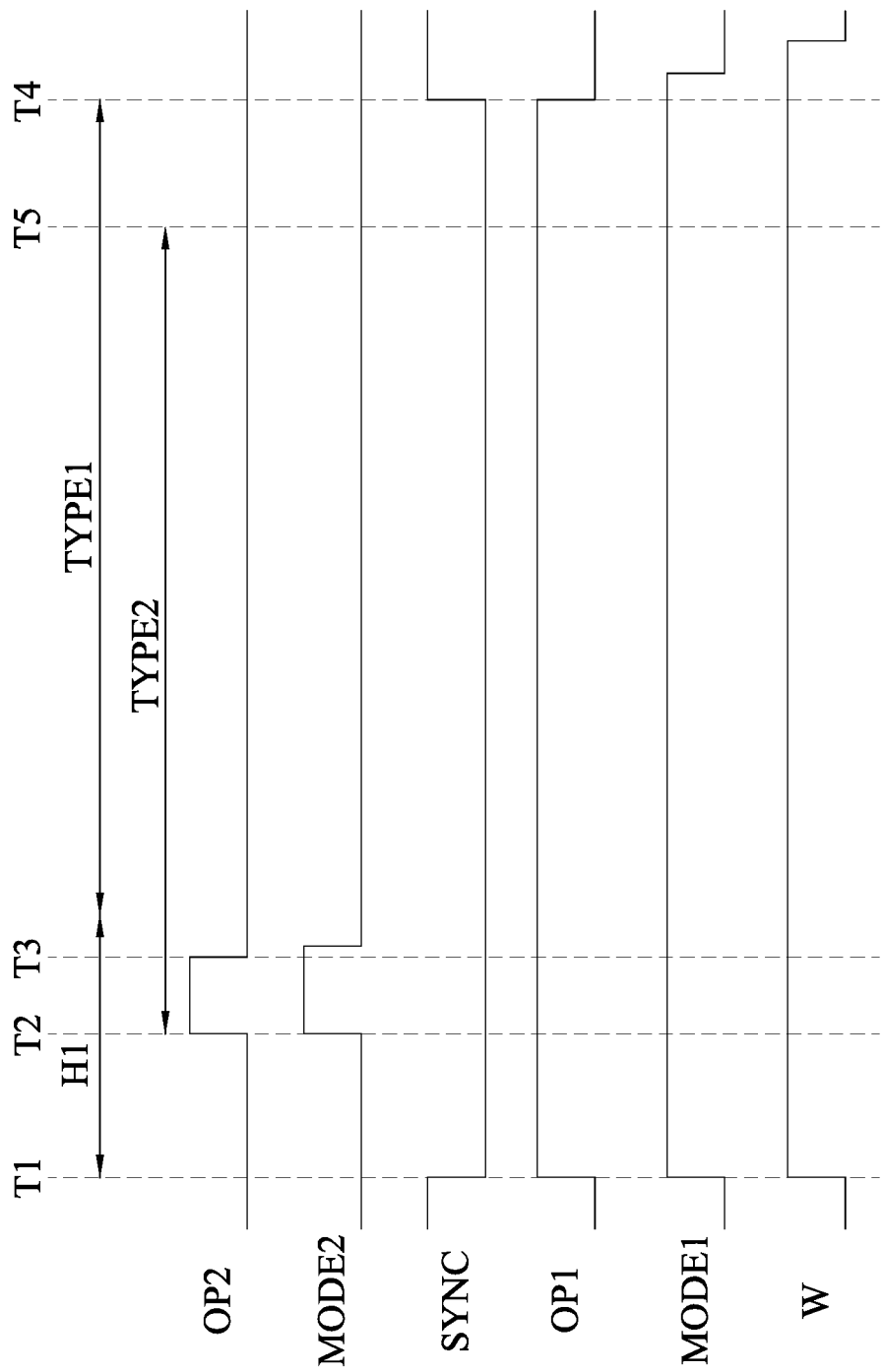
FIG. 10 is a schematic when a touch display device is in a stylus mode according to one embodiment of the present disclosure.

FIG. 10 is a schematic when a touch display device is in a stylus mode according to one embodiment of the present disclosure. In the present embodiment, the first touch source TYPE 1 is a stylus, and the second touch source TYPE 2 is palm or finger. Specifically, when there is a stylus touches the touch display apparatus 100, the finger, palm, and water as mentioned above are categorized as the second touch source TYPE 2. Since the signals from the stylus 300 and the signals from the fingers have opposite polarity, the first touch source T1 which moving towards the touch display apparatus 100 and touches the touch display apparatus 100 later is sensed by the self-capacitance sensing function at a first time point T1. The second touch source TYPE2 touches the touch display apparatus 100 at a second time point T2.

In the present embodiment, the first time point T1 is earlier than the second time point T2. When the transmission operation OP1 corresponding to the first touch source TYPE1 rises to the high level at the first time point T1, the sensing signal of the first touch source TYPE1 is transferred to the CPU. The signal of the CPU mode MODE1 corresponding to the stylus also rises to the high level, and therefore the CPU of the touch display apparatus 100 is switched to the stylus mode W. The synchronization signal SYNC falls to the low level at the first time point T1 so as perform the step of identifying the first touch source TYPE1 and the second touch source TYPE2. Specifically, the step of identifying the first touch source TYPE1 and the second touch source TYPE2 is the step of stopping transferring the second sensing signal as mentioned above regarding to FIG. 9A to FIG. 9C. In other words, after the sensing signal corresponding to the second touch source TYPE2 is received by the CPU, transferring of the sensing signal to the CPU is stopped at the third time point T3. As shown in FIG. 10, the second touch source TYPE2 touches the touch display apparatus 100 at the second time point T2. Therefore, after the second time point T2, the signal of the transmission operation OP2 and the CPU mode MODE2 corresponding to the second touch source TYPE2 fall to the low level at the third time point T3. The aforementioned CPU mode MODE1, MODE2 can be accomplished by the same CPU.

As shown in FIG. 10, at the fourth time point T4, when there is no sensed first touch source TYPE1, the synchronization signal SYNC rises to the high level at the fourth time point T4, and the CPU is switched to the standby mode later. In other words, after the synchronization signal SYNC falls to the low level, transferring of the sensing signal to the CPU is stopped continuously (that is the transmission operation OP2 remains at the low level) even there is a second touch source TYPE2 sensed. And the transmission operation OP2 is restart until the second touch source TYPE2 is completely removed (at a fifth time point T5) and a new second touch source OP2 appear. As described above, power consumption of the touch display apparatus 100 can be decreased by omitting transferring sensing results and operation of the CPU when there is only the second touch source.

Figure 11:
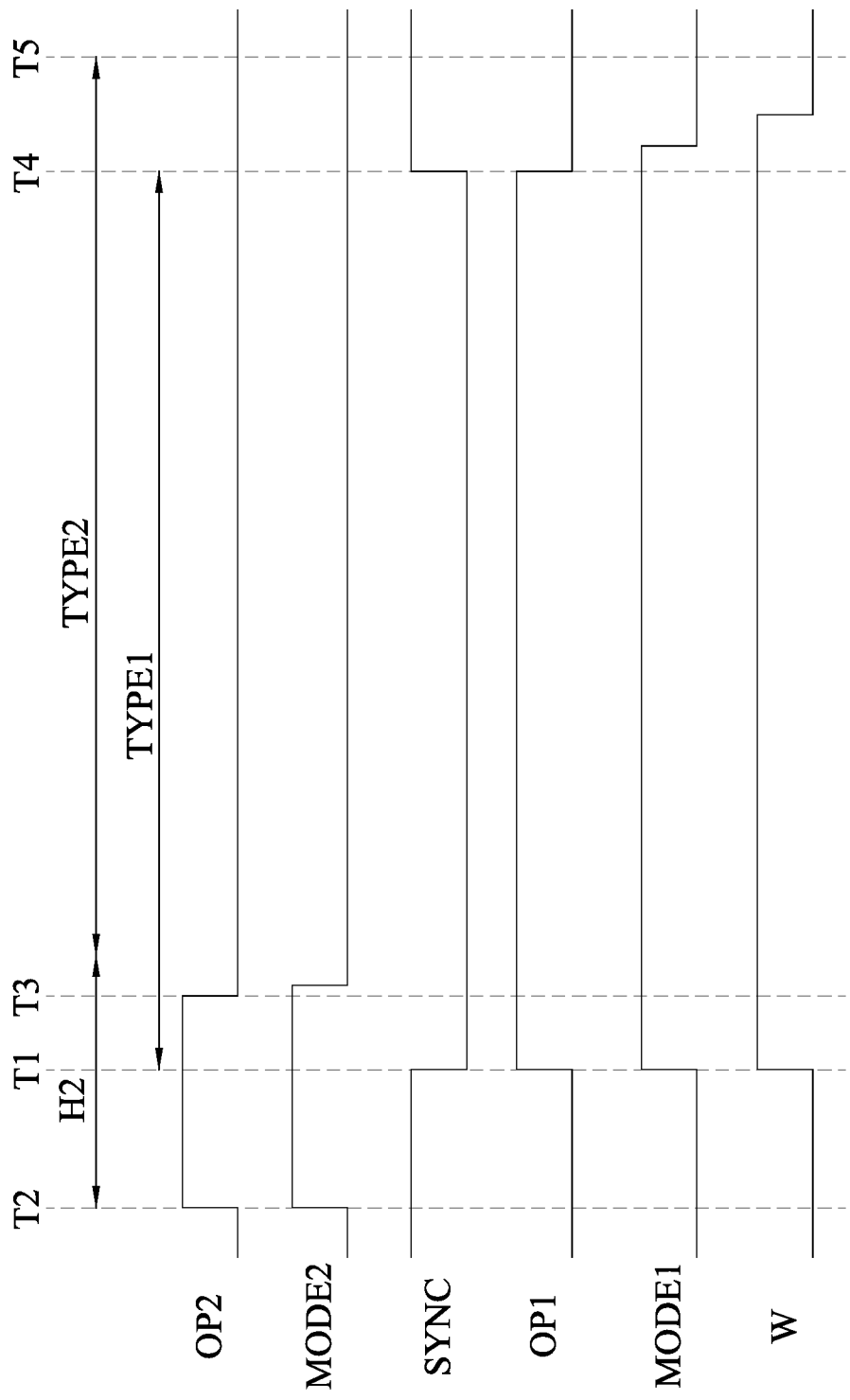
FIG. 11 is a schematic when a touch display device is in a stylus mode according to one embodiment of the present disclosure.

FIG. 11 is a schematic when a touch display device is in a stylus mode according to one embodiment of the present disclosure. Since the signals from the stylus 300 and the signals from the fingers 400 have opposite polarity, the second touch source T2 which moving towards the touch display apparatus 100 and touches the touch display apparatus 100 later is sensed by the self-capacitance sensing function at the second time point T2. The first touch source TYPE1 touches the touch display apparatus 100 at the first time point T1. In the present embodiment, the second time point T2 is earlier than the first time point T1. Therefore, the sensing signal of the second touch source TYPE2 is transferred to the CPU till the third time point T3 continuously after the sensing signal of the first touch source TYPE1 is transferred to the CPU at the first time point T1. The CPU mode MODE2 corresponding to the second touch source TYPE2 rises to the high level until the third time point T3. Therefore, after the sensing signal corresponding to the first touch source TYPE1 is received by the CPU, the transmission operation OP2 reveals that transferring of the sending signals to the CPU is stopped at the third time point T3. In other words, the signals of the transmission operation OP2 corresponding to the second touch source TYPE2 and the CPU mode MODE2 fall to the low level at the time point T3. After the time point T3, the transmission operation OP1, OP2 and the CPU mode MODE1, MODE2 are in the similar states as the embodiment shown in FIG. 10, and the difference is that the fourth time point T4 is earlier than the fifth time point T5. Therefore, the description is not repeated hereinafter.

In summary, power consumption of the touch display apparatus 100 can be decreased by stopping the transferring of sensing signals of the second touch source when there is a first touch source, and the CPU mode corresponding to the second touch source is in the standby mode through identifying the first touch source and the second touch source.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A sensing method of a touch display apparatus, comprising:
   sensing a first touch source at a first time point;
   transferring a first sensing signal of the first touch source to a CPU at the first time point;
   sensing a second touch source at a second time point;
   transferring a second sensing signal of the second touch source to the CPU at the second time point; and
   stopping transferring the second sensing signal at a third time point, and the second touch source is away from the touch display apparatus at a fourth time point;
   wherein the first time point and the second time point are earlier than the third time point, the third time point is earlier than the fourth time point, and the first touch source is different from the second touch source.

2. The sensing method of claim 1, further comprising switching a synchronization signal from a first level to a second level different form the first level at the first time point so as to stop transferring the second sensing signal at the third time point.

3. The sensing method of claim 2, wherein the first time point is earlier than the second time point.

4. The sensing method of claim 2, wherein the second time point is earlier than the first time point.

5. The sensing method of claim 2, wherein when the touch display apparatus is in a stylus mode, a CPU mode corresponding to the second touch source is in a standby mode at the third time point.

6. The sensing method of claim 2, further comprising:
   when the first touch source is not sensed, the synchronization signal is switched from the second level to the first level.

7. The sensing method of claim 1, wherein when the touch display apparatus is in a finger touch mode, the CPU is in a standby mode at the third time point.

8. The sensing method of claim 1, wherein sensing the first touch source further comprising:
   measuring a first signal and a second signal by a first sensing element of the touch display apparatus;
   measuring a third signal by a second sensing element of the touch display apparatus; and
   selecting an intersection between the second signal from the first sensing element and the third signal from the second sensing element so as to identify a touch region of the first touch source.

9. The sensing method of claim 8, wherein sensing the second touch source further comprising:
   selecting an intersection between the first signal from the first sensing element and the third signal from the second sensing element so as to identify a touch region of a finger.

10. A touch display apparatus having a sensing method of claim 1, comprising:
    a first sensing element configured to measure a first signal and a second signal;
    a second sensing element located below the first sensing element, wherein the second sensing element is configured to measure a third signal;
    a flexible display device located between the first sensing element and the second sensing element, wherein the flexible display is configured to select an intersection between the second signal from the first sensing element and the third signal from the second sensing element so as to identify a touch region of the first touch source; and
    a cover located above the first sensing element.

* * * * *